United States Patent [19]
Meyer

[11] 3,712,165
[45] Jan. 23, 1973

[54] PASTRY PRODUCT PRODUCTION SYSTEM

[75] Inventor: Alfred Lake Meyer, Libertyville, Ill.

[73] Assignee: Anestberger Brothers, Inc., Northbrook, Ill.

[22] Filed: Aug. 17, 1970

[21] Appl. No.: 64,284

Related U.S. Application Data

[62] Division of Ser. No. 758,246, Sept. 9, 1968, Pat. No. 3,566,805.

[52] U.S. Cl. ..................83/289, 83/285, 83/293, 83/298, 83/318
[51] Int. Cl. ..............................B23d 25/04
[58] Field of Search....................17/35–40; 18/12–14, 30; 25/8, 11–20; 31/8, 13, 14; 72/253–255; 107/1 R, 1 A, 14 R, 14 A, 14 BA, 44, 69, 68; 83/355, 318, 289, 320, 285, 293–296, 298, 319

[56] References Cited

UNITED STATES PATENTS

| | | | |
|---|---|---|---|
| 2,288,908 | 7/1942 | Kretchman | 83/318 |
| 2,276,545 | 3/1942 | Olgiati | 83/318 |
| 2,713,833 | 7/1955 | Fay | 83/318 UX |
| 2,591,256 | 4/1952 | Hart | 83/318 |
| 3,162,079 | 12/1964 | Bandy et al | 83/318 X |
| 3,251,255 | 5/1966 | Bauman | 83/295 |
| 2,548,427 | 4/1951 | Fernbach | 83/296 |
| 2,689,610 | 9/1954 | Myers | 83/296 |
| 2,133,542 | 10/1938 | Jensen | 83/319 X |
| 3,354,765 | 11/1967 | Frey et al | 83/318 X |
| 1,508,445 | 9/1924 | Davis | 83/304 |
| 1,624,367 | 4/1927 | Schettey | 83/318 |

*Primary Examiner*—James M. Meister
*Attorney*—Davis, Lucas, Brewer & Brugman

[57] ABSTRACT

Low-speed die cut unit for a pastry product production system having a belt conveyor for moving dough therethrough horizontally, comprising a vertically reciprocal die horizontally pivoted at its upper end, intermittently or continuously operable driving means for vertically reciprocating the die, horizontally reciprocable guide means operable by the driving means for moving the lower end of the die and including a backing plate under the conveyor, selectively adjustable means for varying the horizontal throw of the guide means, a normally inoperative clutch, pulse-responsive means for effecting cyclic operation of the clutch, pulse control means for periodically energizing the pulse-responsive means, means selectively operable to vary the period of the pulse control means, and a brake cyclically operable to stop the die at its uppermost position.

7 Claims, 3 Drawing Figures

PATENTED JAN 23 1973

Inventor:
Alfred L. Meyer
By:
Davis, Lucas, Brewer & Brugman
Attys.

Inventor:
Alfred L. Meyer
By: Davis, Lucas, Brewer & Brugman
Attys

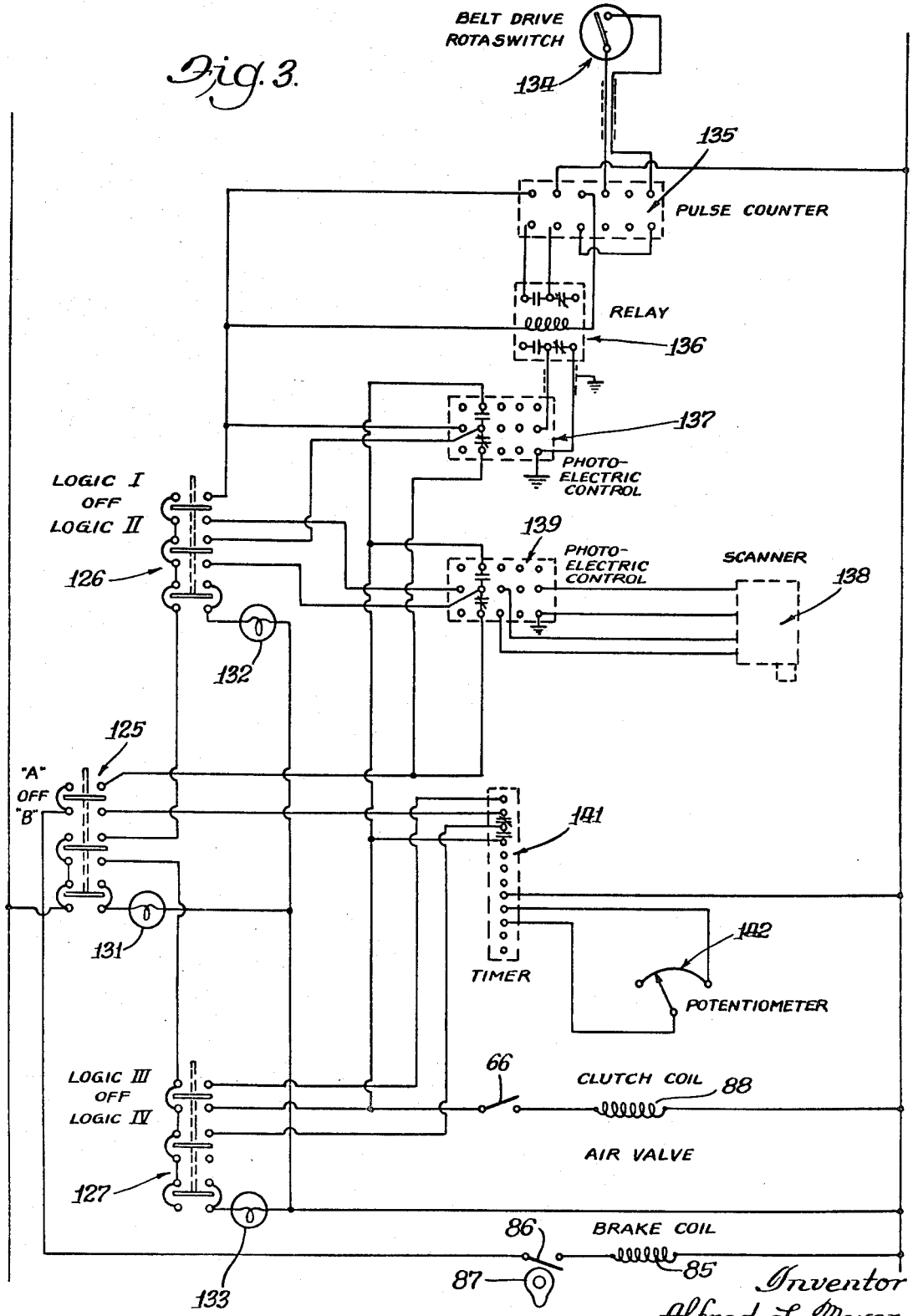

PASTRY PRODUCT PRODUCTION SYSTEM

This application is a division of my co-pending application Ser. No. 758,246, filed U.S. Pat. No. 3,566,805 Sept. 9, 1968.

BACKGROUND OF THE INVENTION

1. Field of the Invention

The invention relates generally to commercial production of pastry products, and more particularly to a novel low-speed die cut unit.

2. Description of the Prior Art

The parent case disclosed a complete automated pastry product production system that may be selectively programmed from a single control station for producing different products. Included as a part of that system is a die cut unit for cutting and/or sealing dough strips carried therethrough on a make-up belt conveyor. Such cutting units of the prior art include vertically reciprocal dies mounted at their upper ends on a horizontal pivot to permit forward horizontal movement of their lower ends by and with the belt conveyor during the lowermost portion of their vertical cutting cycle and rearward return to vertical position after disengagement from the dough, but relatively rapid wear and deterioration of the belt results and variations in the horizontal throw of lower ends of the dies can be effected only be changing the speed of the conveyor.

SUMMARY OF THE INVENTION

To overcome these objections and facilitate adjustment for any desired range and lengths of cut, this invention provides a positive walk system for the cutting portion of a die without any resulting belt grab or wear and which is selectively adjustable both as to its horizontal throw and the frequency of the vertical die reciprocations.

More specifically, the invention includes a horizontally reciprocable guide means with an adjustable throw for the lower end of the die which is driven by the means for vertically reciprocating the die and includes a backing plate disposed below the conveyor belt, and a normally inoperative cyclic clutch, clutch control means comprising pulse-responsive means, and pulse control means for effecting continuous reciprocations of the die means or periodic energization of the pulse-responsive means, means selectively adjustable to vary the time interval between successive energizations of the pulse-responsive means to determine the frequency of operations of the die means, and brake means automatically operable to terminate each cyclic operation of the clutch mechanism to stop the die means at the top of its vertical throw.

In the drawings:

FIG. 3 is a schematic diagram for the die cut controls.

DESCRIPTION OF THE PREFERRED EMBODIMENT

Figure 1:
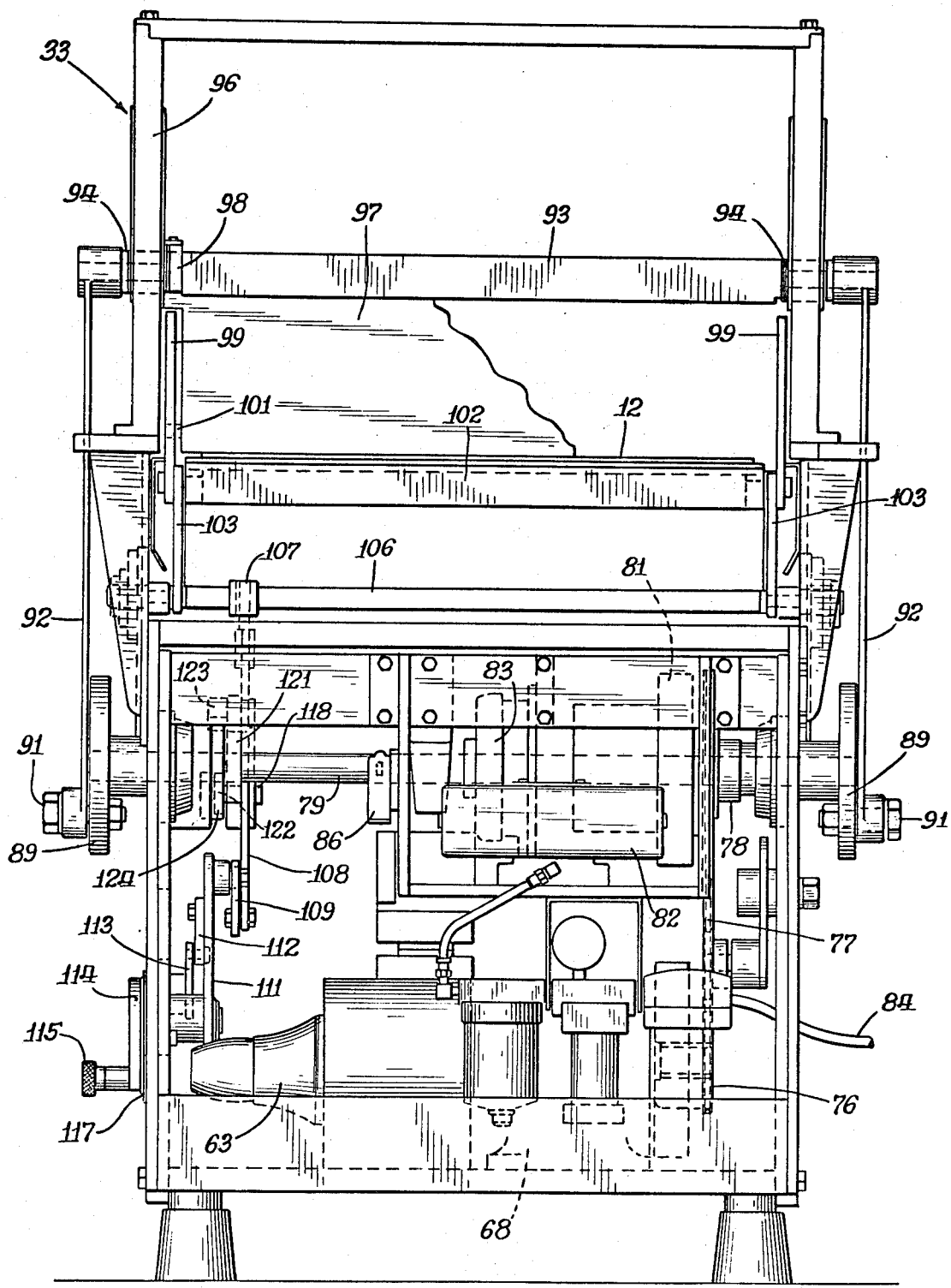
FIG. 1 is a front elevational view of the cutting unit with parts broken away and parts in section.

The pastry product production system of the parent case includes a make-up belt conveyor 12 on which sheeted dough is rolled, filled, formed, and the like, as therein disclosed, which delivers the dough so formed to, and carries the same through, a low-speed die cut unit embodying the features of this invention which is indicated generally by reference numeral 33.

Figure 2:
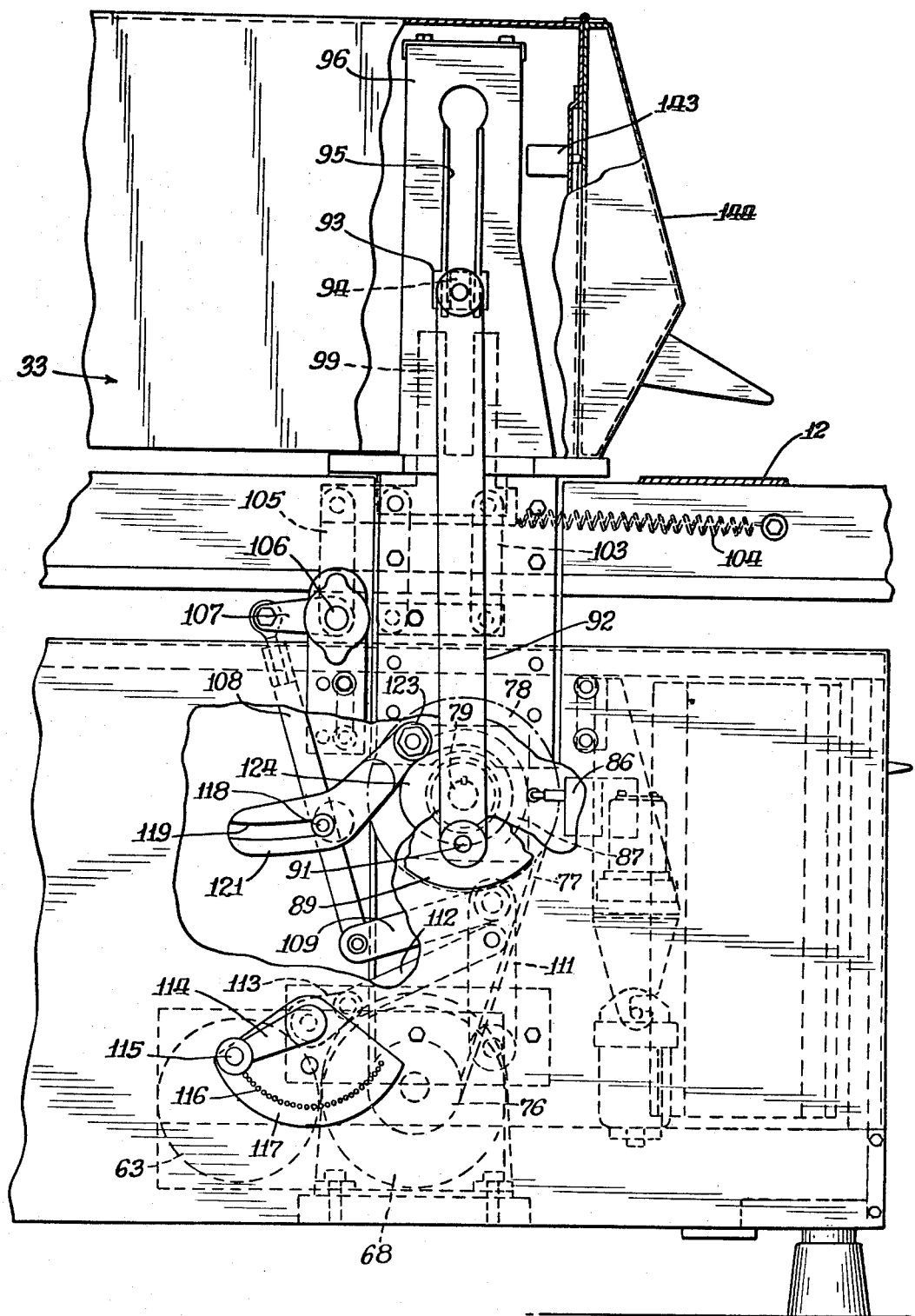
FIG. 2 is a side elevation with parts broken away.

Referring more particularly to FIGS. 1 and 2, the low-speed die cut unit 33 is shown as incorporating one of the slave motors 63 described in my above-identified parent case (which is controlled by the selector switch 66 of FIG. 3) comprising its variable speed motor driving means and associated transmission means including speed-change mechanism and a mechanical drive 68 for driving pulley 76 and a belt 77 co-operating therewith. The belt 77 drives a pulley 78 (FIG. 1) rotatably mounted in well-known manner on a horizontal drive shaft 79 extending transversely of the die cut unit which in turn is suitably rotatably mounted in the frame thereof. A normally disconnected clutch 81 is mounted on the drive shaft 79 adjacent the driven pulley 78 which is adapted to be rendered operative in well-known manner by means of an air valve 82 which normally maintains a brake 83 (also mounted on the drive shaft 79) operative to prevent rotation of the shaft. The valve 82 normally applies air under pressure from a suitable source 84 (FIG. 1) to the brake 83 to maintain the same operative. The air valve 82 is moved from such normal brake-operative position by energization of a suitable coil or solenoid 85 (FIG. 3) which is energized in response to a micro-switch 86 by a cam 87 (FIG. 2) mounted on the drive shaft 79. A clutch coil or solenoid 88 (FIG. 3) also is operatively associated in similar manner with the air valve 82 so that, when the same is energized in a manner later to be described, it moves the air valve from brake-operating to clutch-operating position to render operative the clutch 81 to effect rotation of the drive shaft 79 by the transmission means 68 and members 76 – 78. Thus, energization of the clutch coil 88 results in a cycle of operation comprising 1 complete revolution of the drive shaft 79, with the brake being reactivated to terminate such cyclic operation in response to closing of the brake coil switch 86 by the cam 87.

Secured to the outer ends of the drive shaft 79 are crank disks 89 which are pivotally connected at 91 to the lower ends of crank arms 92. The upper end of each crank arm 92 is journaled on an outer end of a die frame or carrier 93 (FIG. 1) which is provided adjacent the journaled connections with the crank arms 92 with suitable guide blocks 94. Each guide block 94 is slidably disposed in a vertical slot 95 in an upstanding frame member 96 (FIG. 2), whereby rotation of the drive shaft 79 results in vertical reciprocation of the die frame or carrier 93. The frame 93 is adapted to carry any desired type of die 97 for vertical reciprocations therewith, the die depending therefrom and being secured thereto in any suitable manner, as by means of attachment or hanger members 98 as shown in FIG. 1.

It will be understood that the cutting die 97 normally is disposed in its uppermost inoperative position and that as it descends in response to cyclic operation of the drive shaft 79, the lower dough-cutting portions thereof approach the upper reach of the endless belt of the make-up conveyor means 12, which passes through the unit 33 as illustrated in FIGS. 1 and 2, and that at its lowermost point, the die makes non-cutting instantaneous contact with the conveyor belt.

The lower portion of the die 97 co-operates with novel guide means comprising a pair of upstanding die guides 99 vertically slotted (FIG. 2) to receive and co-operate with suitable guide pins 101 (FIG. 1) extending laterally from the die 97. These slotted guides 99 are interconnected adjacent their lower ends by a horizontally disposed and transversely extending die guide backing plate 102 (FIG. 1) and are supported for reciprocal translational movements longitudinally of the conveyor belt 12 by any suitable means, such as parallelogram linkages 103 (FIG. 2) pivotally interconnecting the die guides 99 and the machine frame. A spring 104 (FIG. 2) is interconnected between the machine frame and the forward end of one of the die guides 99 to resiliently retain this die guide mechanism in its normal forward position in which the vertical slots in the die guides 99 are vertically aligned with the associated guide slots 95.

The rear end of each die guide 99 is pivotally connected to a link 105 (FIG. 2), the lower end of which is secured in any suitable manner to a laterally extending rocker shaft 106 rotatably supported in the machine frame. A crank arm 107 is secured to this shaft 106, extends rearwardly therefrom, and is pivotally and adjustably connected in any suitable manner to the upper end of a thrust-rod 108. The lower end of the thrust-rod 108 is pivotally interconnected by means of a rearwardly extending link 109 to an upstanding link 111, the lower end of which is pivotally secured in any suitable manner to the machine frame.

These members 108, 109, and 111 comprise an adjustable linkage which may be selectively positioned in the following manner to determine the extent or degree of longitudinal movements which will be imparted to the thrust-rod 108. An adjusting link 112 is pivotally connected at its forward end to an intermediate portion of the upstanding link 111 and at its rear end to a crank arm 113 which is secured to a suitable shaft journaled in and extending outwardly through the frame of the machine and having a crank handle 114 mounted on its outer end. An outwardly extending and inwardly spring-urged knob 115 of well-known construction is mounted on the free end of this crank handle 114 and is provided with an inwardly extending detent adapted to engage in any one of a plurality of apertures 116 (FIG. 2) arcuately disposed in a latching plate 117 suitably mounted on the exterior of the machine frame.

With this arrangement, it will be seen that selective positioning of the crank handle 114 will result in the same being retained in selected position by the detent on the knob 115 engaging in one of the apertures 116, and that such positioning of the crank handle 114 will correspondingly position the thrust-rod 108. In FIG. 2, these parts are illustrated in their "inoperative" position wherein a pin 118 carried by and extending laterally from the rod 108 is disposed at the forward end of a slot 119 through which it slidably extends and which is provided in the rear arm of a walking beam lever 121 which is pivotally mounted at 122 (FIG. 1) intermediate its ends to the machine frame, and the forwardly extending arm of which lever is provided with a suitable roller 123 that is in peripheral engagement with a disk cam 124 mounted upon the drive shaft 79. When the adjustable linkage is in its position of FIG. 2, the pin 118 carried by the rod 108 will be axially aligned with the center of the pivot 122 of the lever 121. Consequently, rocking movements of the walking beam lever 121 in response to rotation of the cam 124 during a cyclic operation of the drive shaft 79 will be idle and will not be transmitted to the thrust rod 108. However, as the lower end of the rod 108 is moved rearwardly (to the left in FIG. 2), the pin 118 will be moved along the slot 119 in the walking beam 121, and subsequent cyclic operation of the drive shaft 79 will result in reciprocation of the thrust-rod 108 through a distance proportional to the distance to which the pin 118 has been moved rearwardly from its idle position of FIG. 2. The resulting reciprocation of the thrust-rod 108 will be transmitted through the crank arm 107, rocker shaft 106 and links 105 to the die guides 99 and die guide backing plate 102. The cam 124 is so designed and positioned that the resulting rearward movement of the die guide means and backing plate will coincide with the movement of the upper reach of the conveyor belt 12 as the die 97 is performing a dough cutting operation so as to effect longitudinal movement of the lower part of the die substantially coincident with the movement of the conveyor belt. And the parts are so dimensioned that the return or forward movement of the die guide means, backing plate and lower end of the die 97 will be accomplished during the up-stroke of the die, and the brake coil 85 will be energized to effect stopping of the die at its uppermost point of travel.

It thus will be seen that the horizontally reciprocable guide means 99 for the lower dough-cutting part of the die may have any desired degree of movement or throw over a considerable range imparted to it during each cycle which is determined by the selectively adjustable means comprising the thrust-rod 108, pin 118, centrally-pivoted walking beam 121, with the slot 119 extending outwardly from its pivot and receiving the pin 118, and the linkage operable by crank handle 114 for selectively moving the rod 108 to variably position the pin 118 in the slot 119 from a point coincident with the pivot 122 of the beam 121 resulting in zero throw to an outermost point resulting in maximum horizontal throw of the die guides 99. At the same time, the force for effecting such horizontal throw of the lower portion of the vertically reciprocating die is derived from a source (drive shaft 79) other than the conveyor belt 12 or the means for driving it, and the backing plate 102 most effectively supports that portion of the belt being contacted by the die.

As previously indicated, energization of the clutch coil 88 effects movement of the air valve 82 from its normal brake-operative position to clutch-operating position to initiate a cyclic operation of the die cut unit 33 that normally is terminated automatically by energization of the brake coil 85 which returns air valve 82 to normal position to actuate the brake 83. In this clutch control means, the coil 88 performs as a pulse-responsive means for effecting cyclic operation of the clutch 81 and the die cut unit 33, and for operative energization requires only a pulse of approximately one-tenth of a second. In order to enable the operator most effectively to employ the die cut unit 33, pulse control means are provided which are selectively operable in response to movement of the make-up conveyor 12, photoelectric control means controlled by movement of dough pieces on the conveyor 12, or electric timer means adjustable to vary the time interval between successive energizations of the pulse-responsive clutch coil 88, or may be set to provide continuous power to the clutch coil 88 and to disconnect power to the brake coil 85 to effect continuous operation of the die cut unit 33, all to determine the frequency of operations of the die cut unit specifically suited to the nature of the particular pastry product being turned out by the system.

These pulse control means are shown schematically in FIG. 3, and include three normally open, double throw, multiple contact switches 125, 126 and 127 which may be raised or lowered selectively to operative positions, respectively, by associated pairs of suitable control members. Three indicator lamps 131, 132 and 133 are associated, respectively, with switches 125, 126 and 127 and their control members. The pulse control means are adapted to effect operation of the die cut unit 33 in any one of four operating methods, which will be referred to as Logics I, II, III and IV, and only that one selected by the operator in programming, as follows.

Logic I: movement of switches 125 and 126 to their upper active positions indicated in FIG. 3 as "A" and "LOGIC I," which lights indicator lamps 131 and 132.

Logic II: movement of switch 125 to its upper active position "A" and switch 126 to its lower active position indicated as "LOGIC II" in FIG. 3, which also lights indicator lamps 131 and 132.

Logic III: movement of switch 125 to its lower active position "B" and switch 127 to its upper active position indicated "LOGIC III" in FIG. 3, which lights indicator lamps 131 and 133.

Logic IV: movement of switches 125 and 127 to their lower active positions indicated as "B" and "LOGIC IV" in FIG. 3, which also lights indicator lamps 131 and 133.

So setting the switches 125 and 126 to their upper active positions for Logic I renders operative a normally inoperative pulse generator 134 (FIG. 3), such as a "Rotaswitch" operable by the belt drive for the make-up conveyor 12, the output pulses of which are counted in well-known manner by a low powered predetermining counter 135. When the predetermined count has been reached in the counter 135, it actuates a relay 136 to effect transmission of an operation-initiating pulse through a main switching arrangement or control 137 to the die-cut unit 33, and the relay 136 also automatically resets the pulse counter 135. As previously described, the low-speed die cut selector switch 66 is closed when the unit 33 has been selected for use in the system, so this operation-initiating pulse will be effective to energize the clutch coil 88 to initiate a cyclic operation of the unit 33 in the manner earlier noted herein. The control 137 at the same time makes the circuit to the brake coil 85 hot so that the resulting operation of cam 87 to close switch 86 will cause the brake coil to be energized to terminate the cyclic operation of the unit 33.

Setting the switch 125 to its upper active "A" position and switch 126 to its lower active position for Logic II renders operative a normally inoperative photoelectric scanner 138 (FIG. 3) which is positioned at the inlet side of the die-cut unit for operation in response to the passing by of dough pieces on the conveyor belt 12 or register marks thereon to effect transmission in well-known manner of an operation-initiating pulse through a photoelectric control 139, which is similar to the control 137, and causes cyclic operation of unit 33 by energizing clutch coil 88 and rendering the circuit to brake coil 85 hot.

Likewise, a cyclic operation of unit 33 is initiated for energizing clutch coil 88 and rendering the circuit to brake coil 85 hot by a normally inoperative "Electroseal" timer 141 (FIG. 3) emitting an operation-initiating pulse periodically in well-known manner when switch 125 is set to its lower active "B" position and switch 127 is set to its upper position for Logic III. The timer 141 includes the usual means selectively operable to vary the interval between such successive energizations of the pulse-responsive means to determine the frequency of operations of the die-cut unit 33, and a potentiometer 142 may be employed to visually indicate the selected time interval.

Logic IV is a somewhat different mode of operation of the die-cut unit 33 which may be selected by setting the switches 125 and 127 to their lower active positions. This results in maintaining the clutch coil 88 energized and disconnects all power to the brake coil 85 to operate the die-cut head continuously.

Thus it will be seen that the low-speed die-cut unit 33 not only is capable of cutting and sealing long lengths of dough strips, filled or unfilled, but permits of scroll type cutting, etching, etc., because of the facility with which different types of dies may be employed, such as stripper blade, scrapless patty shell, and stamping speciality dies. It provides a positive walk system for the cutting portion of the die which is essential to and assures accurate movement of the die without any belt grab or resistance to the movement of the conveyor belt when the die is completing its downward stroke. Intermittent cutting of any desired range and length of cut, with from 1 to 60 cuts per minute may be accomplished with the several pulse control means provided, and it is always assured that with any selected operation a full cycle will be completed and the die stopped for safety in its uppermost position.

It is thought that the invention and many of its attendant advantages will be understood from the foregoing description, and it will be apparent that various changes may be made in the form construction, and arrangement of the parts without departing from the spirit and scope of the invention or sacrificing all of its material advantages, the form hereinbefore described and shown in the drawings being merely a preferred embodiment thereof.

I claim:

1. A pastry product production system, comprising a low-speed die cut unit including a conveyor for moving dough therethrough horizontally, vertically reciprocal die means, driving means for reciprocating said die means, horizontally reciprocable guide means for said die means operable by said driving means, whereby said die means has a constant vertical throw, and selectively adjustable means for varying the horizontal throw of said guide means, wherein said driving means comprises a normally inoperative cyclic clutch mechanism, and clutch control means for effecting cyclic operation of said clutch mechanism, wherein said selectively adjustable means comprises a thrust-rod with a pin extending outwardly therefrom, a centrally-pivoted walking beam with a slot extending outwardly from the pivot thereof for receiving said pin, and means for selectively moving said rod to variably position said pin in said slot from a point coincident with the pivot of said beam resulting in zero throw to an outermost point resulting in maximum horizontal throw of said guide means.

2. A pastry production system, comprising a low-speed die cut unit including a conveyor for moving dough therethrough horizontally, vertically reciprocal die means, driving means for reciprocating said die means, horizontally reciprocable guide means for said die means operable by said driving means, whereby said die means has a constant vertical throw, and selectively adjustable means for varying the horizontal throw of said guide means, wherein said driving means comprises a normally inoperative cyclic clutch mechanism, and clutch control means for effecting cyclic operation of said clutch mechanism, wherein said clutch control means comprises pulse-responsive means automatically operable to effect operation of said clutch.

3. In a pastry production system according to claim 2, pulse control means for effecting periodic energization of said pulse-responsive means.

4. In a pastry production system according to claim 3, means selectively adjustable to vary the time interval between successive energizations of said pulse-responsive means to determine the frequency of operations of said die means.

5. In a pastry production system according to claim 3, brake means automatically operable to terminate each cyclic operation of said clutch mechanism to stop said die means at the top of its vertical throw.

6. A pastry production system according to claim 3, wherein said pulse control means comprises switches selectively operable in response to movement of said conveyor, photoelectric control means controlled by movement of dough pieces on said conveyor, and electric timer means.

7. A pastry production system according to claim 6, wherein said pulse control means also comprises switch means selectively operable to effect continuous reciprocation of said die means.

* * * * *